March 27, 1951 G. M. GLASFORD ET AL 2,546,338

CIRCUIT FOR MINIMIZING TRANSIENTS DURING SWITCHING BETWEEN TWO VIDEO CHANNELS

Filed May 13, 1947 2 Sheets-Sheet 1

INVENTORS
Glenn M. Glasford and
Edward M. Usher
by
Charles W. Mortimer
ATTY

INVENTORS
Glenn M. Glasford and
Edward M. Usher
by
Charles W. Mortimer
ATTY

Patented Mar. 27, 1951

2,546,338

UNITED STATES PATENT OFFICE 2,546,338

CIRCUIT FOR MINIMIZING TRANSIENTS DURING SWITCHING BETWEEN TWO VIDEO CHANNELS

Glenn M. Glasford, Passaic, and Edward M. Usher, Montclair, N. J., assignors to Allen B. Du Mont Laboratories, Inc., Passaic, N. J., a corporation of Delaware Application May 13, 1947, Serial No. 747,812

5 Claims. (Cl. 178—7.1)

This invention relates to a device for selecting the video outputs of one or more television pick-up tubes and provides means for automatically fading at a predetermined rate from one to the other or permitting lap dissolve of the two signals. Means are provided for eliminating any transients which might appear due to the switching operation. The signal with which this device is particularly useful is a television video signal after blanking has been added.

In accordance with this invention means are provided for varying at a predetermined rate the voltage at any electrode of a vacuum tube capable of controlling the electron flow within the tube between two voltages, one of which will permit the tube to operate normally, the other of which will not permit operation of the tube.

Transients are prevented by a balanced clamping circuit that connects the grid of the tube that amplifies the composite signal to a fixed potential that may be ground every time a horizontal synchronizing pulse is applied to the input of this circuit.

Figure 1:
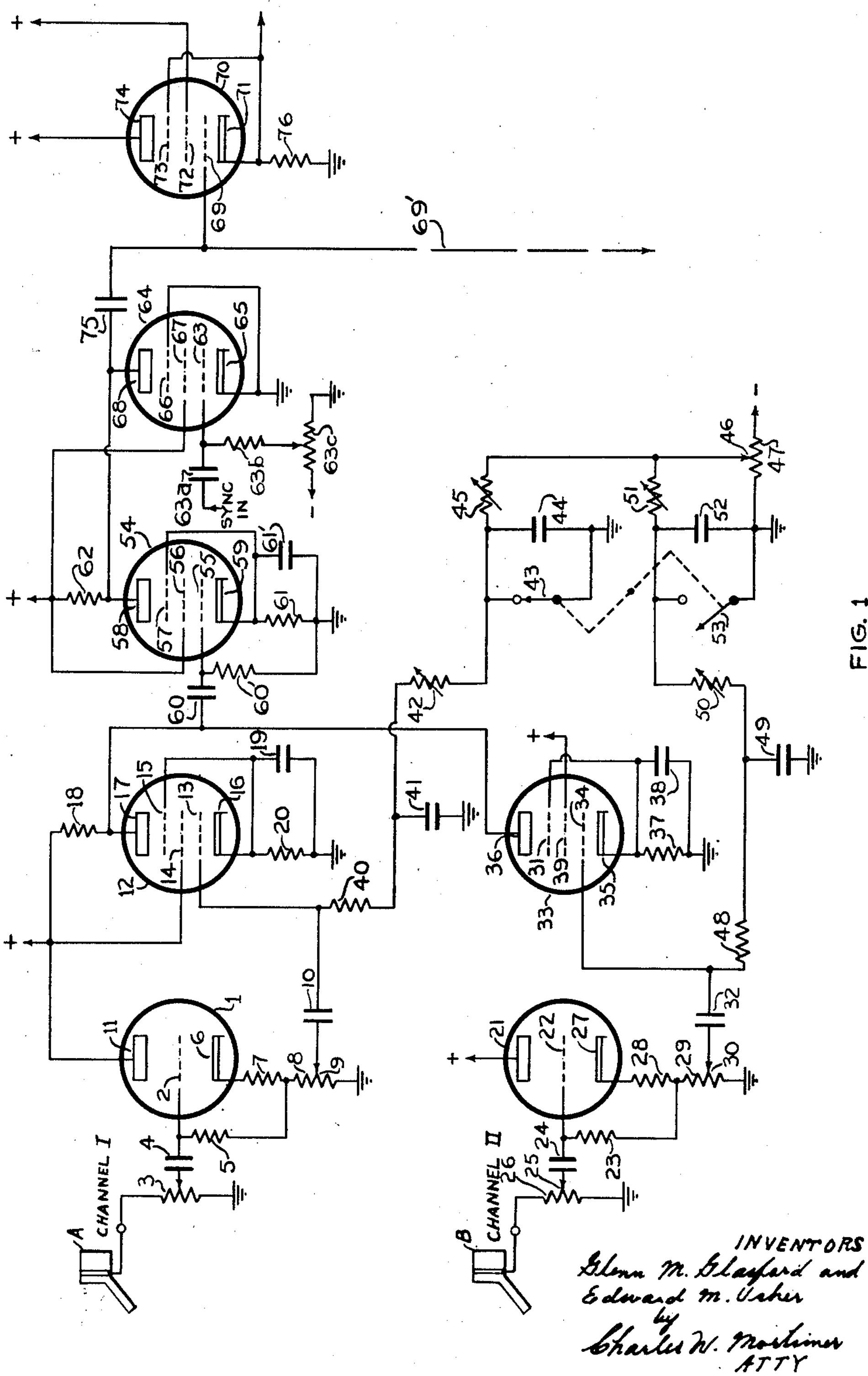
Figure 1A:
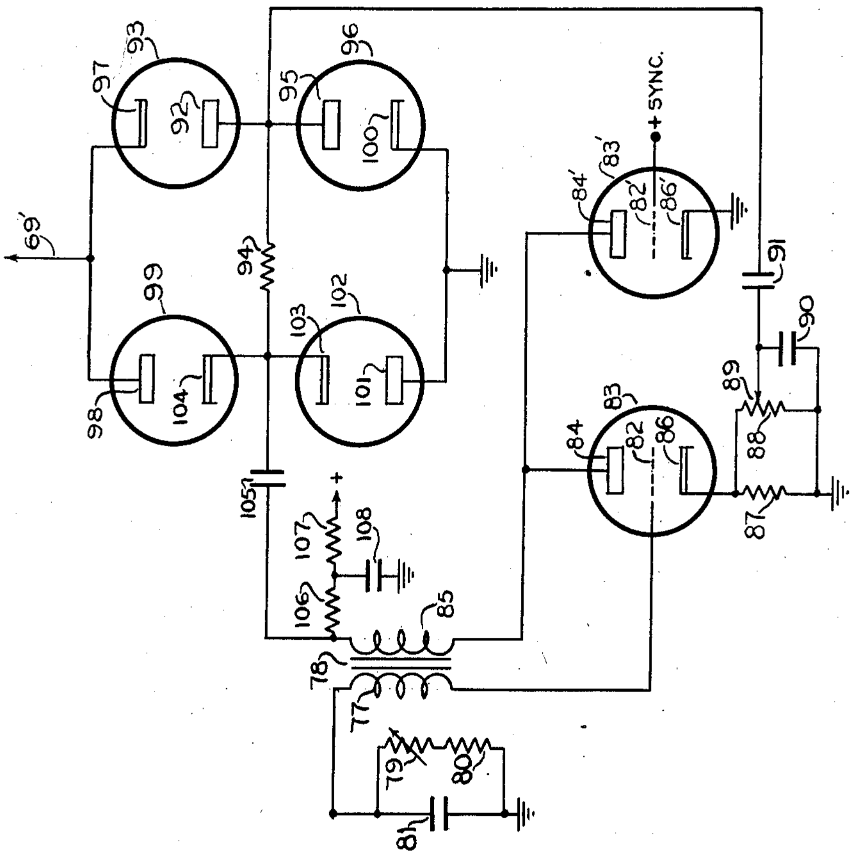

The invention may be understood from the description in connection with the accompanying drawings in which:

Figs. 1 and 1*a* are diagrams of the circuit connections.

Figure 2:
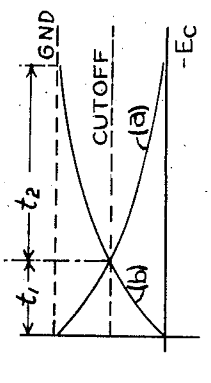
Figure 3:
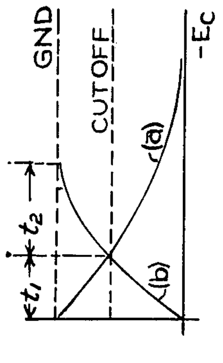

Fig. 2 is a graph of the grid voltages of the two controlled tubes when the time constants are the same, and Fig. 3 is a graph of the grid voltages when the time constants are not the same.

In Fig. 1 reference character 1 indicates a cathode follower triode for channel I. The signal from the pick-up tube A applied to this channel is applied to the grid 2 of tube 1 through a capacitor 4 from the contact of the potentiometer 3 and across the resistor 5 connected back to the junction of two resistors 7 and 8 connected in series between ground and the cathode 6 of the tube 1. The plate 11 of the tube 1 is connected to a source of positive potential.

The resistor 8 in the cathode circuit of tube 1 is coupled through a movable contact 9 and a capacitor 10 to the grid 13 of the tube 12. The screen grid 14 is connected to a source of positive potential and the suppressor grid 15 is connected to cathode 16. The plate 17 is connected to the same source of positive potential through a resistor 18. The cathode 16 of this tube 12 is connected to ground through the capacitor 19 and resistor 20 connected in parallel.

The output of the pickup tube B for channel II is connected to the grid 22 of cathode follower triode 21 through the potentiometer 26 with contact point 25 and capacitor 24 across resistor 23 connected between the grid 22 and the juncture of two resistors 28 and 29 connected in series between the cathode 27 and ground. The resistor 29 is provided with a movable contact 30 which is coupled through capacitor 32 to the grid 34 of the pentode 33. The suppressor grid 31 is connected to the cathode 35. The plate 36 of this pentode 33 is connected to the plate 17 of the pentode 12. The cathode 35 is connected to ground through the resistor 37 and capacitor 38 which are connected in parallel. The screen grid 39 is connected to a source of positive potential.

The control grid 13 of pentode 12 is connected to ground through resistor 40 and capacitor 41 in series, and through variable resistors 42 and 45 in series with a capacitor 44 connected between the juncture of resistors 42, 45 and ground. A single pole single throw switch 43 is connected across this capacitor 44. The other end of resistor 45 is connected to a sliding contact 46 on resistor 47 that is connected between a source of negative potential and ground.

Control grid 34 of pentode 33 is connected to ground through a resistor 48 and a capacitor 49 which is also connected to a variable resistor 50 that is connected to one end of another variable resistor 51 and to ground through a capacitor 52 that has a single pole single throw switch 53 connected across it. The other end of the resistor 51 is connected to the contact 46 on the resistor 47.

The plates 17 and 36 of the pentodes 12 and 33 are connected together and to the grid 55 of the pentode 54 through a condenser 60. Grid 55 is returned to ground through resistor 60′. The cathode 59 is connected to ground through a resistor 61 and condenser 61′ in parallel, and also to the suppressor grid 57. The screen grid 56 is connected to a source of positive potential that is connected to the plate 58 through a resistor 62.

The grid 63 of the pentode is connected to a source of synchronizing signals through condenser 63*a*. Resistors 63*b* and 63*c* provide means for placing a proper negative bias on grid 63. The cathode 65 of this tube 64 is connected to ground and to the suppressor grid 66. The screen grid 67 is connected to a source of positive potential. The plate 68 is connected to this source of positive potential through the resistor 62 and is coupled to the grid 69 of the pentode 70 through the capacitor 75. The cathode 71 of this pentode is connected to the suppressor grid 73 and is also connected to ground through resistor 76. The output is taken off across this resistor 76. The screen grid 72 is connected to a source of positive potential and the plate 74 is also connected to a source of positive potential.

One end of one winding 77 (Fig. 1*a*) of a transformer 78 is connected to ground through a variable resistor 79 in series with a fixed resistor 80, the two resistors being connected in parallel with a capacitor 81. The other end of this winding 77 is connected to the grid 82 of a tube 83. The polarity of the windings is such as to cause this circuit to operate as a blocking oscillator. The plate 84 of this tube 83 is connected to one end of the other winding 85 of the transformer 78. The plate 84 of tube 83 is also connected to the plate 84′ of tube 83′. Grid 82′ of this tube 83′ is connected to a source of synchronizing signals, cathode 86′ being grounded. The cathode 86 of tube 83 is connected to ground through resistors 87 and 88, connected in parallel. Resistor 88 has a variable contact 89 that is connected to one side of capacitors 90 and 91. The other side of capacitor 90 is connected to ground. The other side of capacitor 91 is connected to the junction of the plate 92 of diode 93 to one end of a resistor 94 and to the plate 95 of diode 96. The cathode 97 of the diode 93 is connected to the plate 98 of the diode 99 and to the grid 69 of the pentode 70 (Fig. 1) by lead 69′.

The cathode 100 of the diode 96 is connected to the plate 101 of the diode 102 and to a source of fixed potential which may be ground. The cathode 103 of this diode 102 is connected to the cathode 104 of the diode 99 and the other end of the resistor 94 and to one side of the capacitor 105. The other side of this capacitor 105 is connected to the other end of the winding 85 of the transformer 78 and to the resistor 106. The other end of this resistor is connected through another resistor 107 to a source of positive potential through a capacitor 108 to ground.

The operation is as follows:

When switch 43 is closed and switch 53 is open, the grid 13 of pentode 12 is returned to ground through resistors 40 and 42 and pentode 12 operates normally as an amplifier so that signals from channel I are amplified at the plate 17 of this pentode.

The grid 34 of pentode 33 is returned to a negative voltage determined by the setting of the tap 46 on the resistor 47 which is normally set at a voltage below the cut-off point of pentode 33 so that no signal from channel II is then amplified by pentode 33 to appear at the plate 36.

When switch 43 is opened and switch 53 closed simultaneously, the voltage at the grid 13 of pentode 12 drops to the cut-off point in a time determined by the double time constant 41, 42 and 44, 45. As the pentode 12 is gradually cut off by the building up of this negative grid voltage signals at the plate coming from channel I gradually fade out.

Simultaneously, the bias voltage at the grid 34 of pentode 33 gradually rises to ground level in a time determined by a single time constant comprising resistor 50 and capacitor 49, so that the signal coming from channel II gradually appears at the plate 36 of the pentode 33.

The rate of fade out of one channel and the fade in of the other can be controlled by varying resistors 42, 45, 50 and 51. These resistors may be varied simultaneously. In practice, they may consist of ganged potentiometers or a number of resistors connected to a multi-position ganged switch. When all these resistors are zero, the switch-over is instantaneous, and when they are at maximum value, the time of switch-over is longest.

The variable resistor 47 controls the time between the disappearance of one signal and the appearance of the other. When the setting of contact 46 is near the least negative value the signals become mixed as they are switched. This is known as a lap dissolve. At a greater negative value one completely fades out as the other starts to come in. At a still greater negative value there is actually a short time between the fading out of signals from one pick up and the appearance of signals from the other one.

The reason for the double time constant 41, 42 and 44, 45 or 49, 50 and 51, 52 for cut-off and a single time constant for turning them on is explained as follows:

If only one RC network were used in each grid circuit of tubes 12 and 33, the voltage at the grid 13 of pentode 12 would decrease at the rate indicated by the graph *a* of Fig. 2 while the voltage at the grid 34 of pentode 33 would increase according to graph *b* of Fig. 2. With the cross-over of the two curves at cut-off for both tubes as shown in Fig. 2, one signal will disappear just as the other starts to come in, but the rate of rise of the grid potential of the second tube after the time at which the cross-over point occurs will not match the rate of fall of the grid potential of the first tube before the time of cross-over because of the exponential nature of the curves, i. e., the latter portion of one exponential with a given time constant will not match the beginning portion of the other exponential curve of a circuit with the same time constant.

By making the time constant of the two circuits unequal the effect of Fig. 3 can be achieved in which the two curves more nearly match so that the time one signal takes to fade out equals the time the other takes to come on.

The combined signal is applied to a stage of amplification comprising pentode 54. It is then mixed with the synchronizing signal that is applied to grid 63 of pentode 64 and coupled to the grid 69 of pentode 70 through capacitor 75. Output is taken from the cathode of tube 70.

Diodes 93, 96, 99 and 102 are connected in a clamp circuit controlled by a driver circuit comprising transformer 78 and triode 83. Its function is to connect the grid 69 of pentode 70 to a fixed potential, which may be ground, every time a horizontal synchronizing pulse is applied to the circuit.

This arrangement permits the preceding amplifier stages to be designed for perfect response to the horizontal line and higher frequencies. It further eliminates any extraneous low frequency pickup or power supply ripple that may appear in the video channel. It also eliminates any transient output due to the operation of the channel selector switches.

The triode 83 and transformer 78 and the associated capacitors and resistors operate as a blocking oscillator. Negative pulses are obtained from the plate 84 through the winding 85 of the transformer 78 and the capacitor 105 to the juncture of resistor 94 and the cathode 104 of diode 99 and the cathode 103 of the diode 102. Positive pulses are obtained from the cathode 86 of the triode 83 across the resistor 87 and 88 at the variable contact 89 that is by-passed to ground through capacitor 90 and coupled through capacitor 91 to the juncture of plate 92 of diode 93 and plate 95 of diode 96 and one end of resistor 94. When both a positive and a negative pulse appear at opposite ends of the resistor 94 all of the diodes 93, 96, 99 and 102 conduct thus connecting the grid 69 of pentode 70 to a fixed potential. All of the diodes are open except when these pulses appear.

The resistor 94 develops a voltage drop from any direct current leakage through the capacitors 91 and 105 and so tends to prevent either end of this resistor from reaching the potential of either the cathode 86 or the plate 84 of the triode 83. The purpose of this device is to hold the grid 69 of the pentode 70 at a constant potential regardless of transients and power supply ripple. With this device the system is required to pass only the higher frequency components of the signal. It also prevents the appearance of blemishes on the television picture when the switches are operated.

What is claimed is:

1. In a device for selecting the output signal from one of a plurality of television signal channels each said channel having an amplifier tube connected thereto, each said tube being normally conducting, a source of bias voltage, switching means connected to said source and to each said tube to apply selectively said bias voltage to each said tube to cut off said tube, and a resistance capacitance network connected to each said tube to control the rate of increase of said bias voltage applied thereto and the rate of decrease of said bias voltage removed therefrom by said switching means.

2. In a device for selecting the output signal from one of a pair of television signal channels each said channel having an amplifier tube connected thereto, each said amplifier tube being normally conducting, a source of biasing voltage and a pair of switches ganged together and connected to said source and to each said tube to apply said biasing voltage selectively to each said tube, and a resistance capacitance network connected to each said amplifier tube, said switches being connected to change the time constant of each said resistance capacitance network to cause the time required by one said amplifier tube to cut off when the switches are actuated and biasing voltage is applied thereto, to equal the time required by the other said amplifier tube to conduct when biasing voltage is removed therefrom.

3. A device for selecting video output comprising a plurality of television pickup devices each said pickup device having an electron discharge device connected thereto to amplify the video signal therefrom, each said electron discharge device having an electron beam controlling electrode, a source of bias voltage, an integrating circuit connected thereto, and a switching device connected to each said electrode to apply selectively said voltage thereto and also connected to said integrating circuit to change the time constant thereof.

4. The apparatus in accordance with claim 3 in which said integrating circuit comprises a resistance capacitance network and said switching device is connected to short out a portion of said network thereby to change the time constant thereof.

5. The apparatus according to claim 4 including a variable resistor connected between said source of voltage and said integrating network.

GLENN M. GLASFORD.
EDWARD M. USHER.

REFERENCES CITED

The following references are of record in the file of this patent:

UNITED STATES PATENTS

| Number | Name | Date |
|---|---|---|
| 2,043,997 | Goldsmith | June 16, 1936 |
| 2,164,297 | Bedford | June 27, 1939 |
| 2,240,420 | Schnitzer | Apr. 20, 1941 |
| 2,244,240 | Blumlein | June 3, 1941 |
| 2,307,375 | Blumlein | Jan. 5, 1943 |
| 2,412,279 | Miller | Jan. 5, 1943 |